United States Patent
Kim et al.

(10) Patent No.: US 11,053,411 B2
(45) Date of Patent: Jul. 6, 2021

(54) REUSABLE ATTACHING APPARATUS AND METHODS OF MAKING AND USING A REUSABLE ATTACHING APPARATUS

(71) Applicant: The Board of Trustees of the University of Illinois, Urbana, IL (US)

(72) Inventors: Seok Kim, Champaign, IL (US); Jeffrey D. Eisenhaure, Champaign, IL (US); Jun Kyu Park, Champaign, IL (US)

(73) Assignee: THE BOARD OF TRUSTEES OF THE UNIVERSITY OF ILLINOIS, Urbana, IL (US)

( * ) Notice: Subject to any disclaimer, the term of this patent is extended or adjusted under 35 U.S.C. 154(b) by 0 days.

(21) Appl. No.: 16/929,648

(22) Filed: Jul. 15, 2020

(65) Prior Publication Data
US 2020/0347272 A1    Nov. 5, 2020

Related U.S. Application Data

(62) Division of application No. 15/852,712, filed on Dec. 22, 2017, now Pat. No. 10,752,809.
(Continued)

(51) Int. Cl.
*C09J 5/06*     (2006.01)
*C09J 7/35*     (2018.01)
(Continued)

(52) U.S. Cl.
CPC .................. *C09J 5/06* (2013.01); *B29C 65/02* (2013.01); *B29C 65/48* (2013.01); *C09J 7/35* (2018.01);
(Continued)

(58) Field of Classification Search
CPC .................... B29C 65/02; B29C 65/48; B29C 65/34–3696; C09J 7/35; C09J 5/06;
(Continued)

(56) References Cited

U.S. PATENT DOCUMENTS 6,986,855 B1    1/2006  Hood et al.
7,927,976 B2    4/2011  Menard
(Continued)

FOREIGN PATENT DOCUMENTS

WO    WO 2015/184088 A1    12/2015

OTHER PUBLICATIONS

Ahmed, Numair et al., "Active Polymeric Composite Membranes for Localized Actuation and Sensing in Microtransfer Printing," *Journal of Microelectromechanical Systems*, 24, 4 (2015) pp. 1016-1028.
(Continued)

*Primary Examiner* — John L Goff, II
(74) *Attorney, Agent, or Firm* — Brinks Gilson & Lione

(57) ABSTRACT

A reusable attaching apparatus includes (a) a reversible adhesive comprising a shape memory polymer and (b) a mounting structure bonded to the reversible adhesive. The shape memory polymer has a glass transition temperature ($T_g$) and comprises a deformable state at temperatures above the $T_g$ and a rigid state at temperatures below the $T_g$.

20 Claims, 5 Drawing Sheets

Related U.S. Application Data

(60) Provisional application No. 62/438,738, filed on Dec. 23, 2016.

(51) Int. Cl.
```
B29C 65/48    (2006.01)
B29C 65/02    (2006.01)
F16B 47/00    (2006.01)
C09J 9/00     (2006.01)
F16B 1/00     (2006.01)
F16B 11/00    (2006.01)
C09J 163/00   (2006.01)
```

(52) U.S. Cl.
CPC ............... *C09J 9/00* (2013.01); *F16B 1/0014* (2013.01); *F16B 11/006* (2013.01); *F16B 47/003* (2013.01); *C09J 163/00* (2013.01); *C09J 2301/502* (2020.08); *C09J 2463/00* (2013.01)

(58) Field of Classification Search
CPC . C09J 9/00; C09J 9/02; C09J 2301/502; C09J 163/00; C09J 2463/00; A47G 1/17; A47G 1/175; F16B 1/0014; F16B 11/006; F16B 47/003
See application file for complete search history.

(56) References Cited

U.S. PATENT DOCUMENTS

| | | | |
|---|---|---|---|
| 8,057,891 | B2 | 11/2011 | Cheng et al. |
| 8,062,568 | B2 | 11/2011 | Lee |
| 8,093,340 | B2 | 1/2012 | Xie et al. |
| 8,236,129 | B2 | 8/2012 | Xie et al. |
| 8,237,324 | B2 | 8/2012 | Pei et al. |
| 8,251,163 | B2 | 8/2012 | Xie et al. |
| 8,506,867 | B2 | 8/2013 | Menard |
| 8,628,838 | B2 | 1/2014 | Xie et al. |
| 8,685,528 | B2 | 4/2014 | Xie et al. |
| 9,358,775 | B2 | 6/2016 | Bower et al. |
| 2009/0289029 | A1 | 11/2009 | Vecchione et al. |
| 2010/0123268 | A1 | 5/2010 | Menard |
| 2010/0316845 | A1 | 12/2010 | Rule et al. |
| 2012/0159892 | A1 | 6/2012 | Summons et al. |
| 2013/0069275 | A1 | 3/2013 | Menard et al. |
| 2013/0302464 | A1 | 11/2013 | Zheng et al. |
| 2014/0069578 | A1 | 3/2014 | Xie et al. |
| 2015/0086791 | A1* | 3/2015 | Browne .................. B32B 7/12 428/414 |
| 2015/0096117 | A1 | 4/2015 | Forrest et al. |
| 2015/0359043 | A1 | 12/2015 | Kim et al. |

OTHER PUBLICATIONS

Al-okaily, Ala'a M. et al., "Multi-physics modeling for laser micro-transfer printing delamination," *Journal of Manufacturing Processes*, 20 (2015) pp. 414-424.

Berger, M., "Microfabrication Inspired by Lego," *NanoWerk* (2013) pp. 1-3.

Bhaswara, A. et al., "Fabrication of nanoplate resonating structures via micro-masonry," *J. Micromech. Microeng.*, 24, 115012 (2014) pp. 1-8.

Carlson, Andrew et al., "Active, Programmable Elastomeric Surfaces with Tunable Adhesion for Deterministic Assembly by Transfer Printing," *Advanced Functional Materials*, 22 (2012) pp. 4476-4484.

Carlson, Andrew et al., "Shear-enhanced adhesiveless transfer printing for use in deterministic materials assembly," *Applied Physics Letters*, 98 (2011) pp. 264104-1-264104-3.

Carlson, Andrew et al., "Transfer Printing Techniques for Materials Assembly and Micro/Nanodevice Fabrication," *Advanced Materials*, 24 (2012) pp. 5284-5318.

Dechev, Nikolai et al., "Microassembly of 3-D Microstructures Using a Compliant, Passive Microgripper," *Journal of Microelectromechanical Systems*, 13, 2 (Apr. 2004) pp. 176-189.

Eisenhaure, J. et al., "Aphid Foot Inspired Reversible Dry Adhesives," Abstract from 2012 MRS Fall Meeting in Boston, MA, Nov. 28, 2012, 1 page.

Eisenhaure, J. et al., "Micro-Structured Shape Memory Polymer Based Stamps with Controllable Adhesion," Abstract from ASME 2012 International Mechanical Engineering Congress & Exposition (IMECE) in Houston, TX, Nov. 9-15, 2012, 1 page.

Eisenhaure, J. et al., "Microstructured Shape Memory Polymer Surfaces with Reversible Adhesion," Presentation from Materials Research Society (MRS) Fall Meeting in Boston, MA, Nov. 28, 2012, pp. 1-11.

Eisenhaure, J. et al., "Microstructured Shape Memory Polymer Surfaces with Reversible Adhesion," Presentation from International Mechanical Engineering Conference & Exposition (IMECE) in Houston, TX, Nov. 13, 2012, pp. 1-15.

Eisenhaure, J. et al., "A Review of the State of Dry Adhesives: Biomimetic Structures and the Alternative Designs They Inspire," *Micromachine* 8 (2017) 125 pp. 1-38.

Eisenhaure, J. et al., "Laser-Driven Shape Memory Effect for Transfer Printing Combining Parallelism with Individual Object Control," *Advance Mater Technology* 1 (2016) 1600098 pp. 1-11.

Eisenhaure, J., "Microstructured Shape Memory Polymer Surfaces with Reversible Dry Adhesion," *ACS Appl. Mater. Interfaces*, 5 (2013) pp. 7714-7717.

Eisenhaure, Jeffrey D. et al., "The Use of Shape Memory Polymers for MEMS Assembly," *Journal of Microelectromechanical Systems*, 25, 1 (2016) pp. 69-77.

Eisenhaure, Jeffrey et al., "An Internally Heated Shape Memory Polymer Dry Adhesive," *Polymers*, 6 (2014) pp. 2274-2286.

Fan, Zhiyong et al., "Large-scale, heterogeneous integration of nanowire arrays for image sensor circuitry," *PNAS*, 105, 32 (2008) pp. 11066-11070.

Fuchiwaki, Ohmi et al., "Multi-axial Micromanipulation Organized by Versatile Micro Robots and Micro Tweezers," *2008 IEEE International Conference on Robotics and Automation*, Pasadena, CA, USA, May 19-23, 2008, pp. 893-898.

Haliyo, D. Sinan et al., "Advanced applications using [mü]MAD, the adhesion based dynamic micro-manipulator," *Proceedings of the 2003 IEEE/ASME International Conference on Advanced Intelligent Mechatronics* (AIM 2003) pp. 880-885.

Huang, Jan-Chan et al., "Carbon Black Filled Conducting Polymers and Polymer Blends," *Advances in Polymer Technology*, 21, 4 (2002) pp. 299-313.

Huang, Jan-Chan et al., "Processability, Mechanical Properties, and Electrical Conductivities of Carbon Black-Filled Ethylene-Vinyl Acetate Copolymers," *Advances in Polymer Technology*, 19, 2 (2000) pp. 132-139.

Jeong, Bongwon et al., "Complex nonlinear dynamics in the limit of weak coupling of a system of microcantilevers connected by a geometrically nonlinear tunable nanomembrane," *Nanotechnology*, 25, 465501 (2014) pp. 1-16.

Jeong, Jae-Woong et al., "Two-axis MEMS scanner with transfer-printed high-reflectivity, broadband monolithic silicon photonic crystal mirrors," *Optics Express*, 21, 11 (Jun. 3, 2013) pp. 13800-13809.

Kanari, Katsuhiko et al., "Thermal Conductivity of Epoxy Resins Cured with Aliphatic Amines," *Polymer Journal*, 4, 4 (1974) pp. 372-378.

Keum, Hohyun et al., "Silicon micro-masonry using elastomeric stamps for three-dimensional microfabrication," *Journal of Micromechanics and Microengineering*, 22 (2012) 055018 (7 pp).

Kim, Dae-Hyeong et al., "Materials for Multifunctional Balloon Catheters With Capabilities in Cardiac Electrophysiological Mapping and Ablation Therapy," *Nat. Mater.*, 10, 4 (2011) pp. 316-323.

Kim, S. et al., "Microstructured Elastomeric Surfaces with Reversible Adhesion and Examples of Their Use in Deterministic Assembly by Transfer Printing," *PNAS*, 107, 40 (2010) pp. 17095-17100.

Kim, S. et al., "Reversible Dry Micro-Fibrillar Adhesives with Thermally Controllable Adhesion," *Soft Matter*, 5 (2009) pp. 3689-3693.

(56) References Cited

OTHER PUBLICATIONS

Kim, Seok et al., "Enhanced adhesion with pedestal-shaped elastomeric stamps for transfer printing," *Applied Physics Letters*, 100 (2012) pp. 171909-1-171909-4.

Kim, Tae-il et al., "Thin Film Receiver Materials for Deterministic Assembly by Transfer Printing," *Chemistry of Materials*, 26, 14 (2014) pp. 3502-3507.

Liu, C. et al., "Review of Progress in Shape-Memory Polymers," *J. Mater. Chem.*, 17 (2007) pp. 1543-1558.

Loebich, Otto, "The Optical Properties of Gold—A Review of Their Technical Utilisation," *Gold Bull.* 5 (1972) pp. 2-10.

Meitl, Matthew A. et al., "Transfer printing by kinetic control of adhesion to an elastomeric stamp," *Nature Materials*, 5 (2006) pp. 33-38.

Mengüç, Yiğit et al., "Gecko-Inspired Controllable Adhesive Structures Applied to Micromanipulation," *Advanced Functional Materials*, 22 (2012) pp. 1246-1254.

Miyazaki, Hideki T. et al., "Adhesion of micrometer-sized polymer particles under a scanning electron microscope," *Journal of Applied Physics*, 88, 6 (Sep. 15, 2000) pp. 3330-3340.

Saeidpourazar, Reza et al., "A prototype printer for laser driven micro-transfer printing," *Journal of Manufacturing Processes*, 14 (2012) pp. 416-424.

Saeidpourazar, Reza et al., "Laser-Driven Micro Transfer Placement of Prefabricated Microstructures," *Journal of Microelectromechanical Systems*, 21, 5 (Oct. 2012) pp. 1049-1058.

Saito, Shigeki et al., "Non-impact deposition for electrostatic micromanipulation of a conductive particle by a single probe," *Journal of Micromechanics and Microengineering*, 18 (2008) 107001 (3 pp).

Spearing, S. M., "Materials Issues in Microelectromechanical Systems (MEMS)," *Acta Materialia*, 48 (2000) pp. 179-196.

Viventi, Jonathan et al., "A Conformal, Bio-interfaced Class of Silicon Electronics for Mapping Cardiac Electrophysiology," *Sci. Transl. Med.*, 2, 24 (2010) pp. 1-15.

Volk, B., "Characterization of Shape Memory Polymers," NASA Langley Research Centre, Texas A&M University (2005) 11 pages.

Wanka, Stefanie et al., "Measuring Adhesion Forces in Powder Collectives by Inertial Detachment," *Langmuir*, 29 (2013) pp. 16075-16083.

Xie, T., "Recent Advances in Polymer Shape Memory," Polymer 52 (2011) pp. 4985-5000.

Xie, Tao et al., "Facile tailoring of thermal transition temperatures of epoxy shape memory polymers," *Polymer*, 50 (2009) pp. 1852-1856.

Xie, Tao et al., "Self-Peeling Reversible Dry Adhesive System," *Chem. Mater.*, 20 (2008) pp. 2866-2868.

Xue, Yeguang et al., "A theoretical model of reversible adhesion in shape memory surface relief structures and its application in transfer printing," *J. Mech. Phys. Solids*, 77 (2015) pp. 27-42.

Yang, Sang Yoon et al., "Elastomer Surfaces with Directionally Dependent Adhesion Strength and Their Use in Transfer Printing with Continuous Roll-to-Roll Applications," *Advanced Materials*, 24 (2012) pp. 2117-2122.

Yang, Yumi et al., "Arrays of Silicon Micro / Nanostructures Formed in Suspended Configurations for Deterministic Assembly Using Flat and Roller-Type Stamps," *Small*, 7, 4 (2011) pp. 484-491.

Yang, Zining et al., "A Tip-Tilt-Piston Micromirror With an Elastomeric Universal Joint Fabricated via Micromasonry," *Journal of Microelectromechanical Systems*, 24, 2 (2015) pp. 262-264.

Zhang, Yong et al., "Autonomous Robotic Pick-and-Place of Microobjects," *IEEE Transactions on Robotics*, 26, 1 (Feb. 2010) pp. 200-207.

Zhang, Yong et al., "Micro-Masonry of MEMS Sensors and Actuators," *Journal of Microelectromechanical Systems*, 23, 2 (Apr. 2014) pp. 308-314.

Zheng, N., et al., "High Strain Epoxy Shape Memory Polymer," Polymer Chemistry 6 (2015) pp. 3046-3053.

\* cited by examiner

REUSABLE ATTACHING APPARATUS AND METHODS OF MAKING AND USING A REUSABLE ATTACHING APPARATUS

RELATED APPLICATIONS

The present patent document is a division of U.S. patent application Ser. No. 15/852,712, filed on Dec. 22, 2017, and now U.S. Pat. No. 10,752,809, which claims the benefit of priority under 35 U.S.C. § 119(e) to U.S. Provisional Patent Application No. 62/438,738, filed on Dec. 23, 2016. Both of the preceding patent applications are hereby incorporated by reference in their entirety.

TECHNICAL FIELD

The present disclosure is related generally to shape memory polymers and more particularly to shape memory polymer (SMP) adhesives.

BACKGROUND

Contemporary adhesives are generally intended to form either permanent or temporary bonds to one or more surfaces, or adherends. Liquid adhesives and coatings (such as glues, liquid epoxies, or paints) may be used to form very strong and permanent bonds, while pressure sensitive adhesives (such as adhesive tapes and stickers) adhere to surfaces more weakly and are typically removable. Despite their capacity for removal, pressure sensitive adhesives typically are not reusable due to their tendency to irreversibly pick up debris and/or lose adhesive material (as residue) on the initial adherend. A strong, removable, and reusable adhesive compatible with various surfaces would be beneficial for numerous applications, including home wall hangings, industrial assembly, and outdoor usage.

BRIEF SUMMARY

A reusable attaching apparatus based on a shape memory polymer adhesive has been developed for indoor and outdoor applications, including wet surface usage. Described in this disclosure are features of the reusable attaching apparatus, a method of fabricating the reusable attaching apparatus, and a method of attaching the reusable attaching apparatus to a mounting surface.

The reusable attaching apparatus includes (a) a reversible adhesive comprising a shape memory polymer and (b) a mounting structure bonded to the reversible adhesive. The shape memory polymer has a glass transition temperature ($T_g$) and comprises a deformable state at temperatures above the $T_g$ and a rigid state at temperatures below the $T_g$.

The fabrication method includes forming a reversible adhesive comprising a shape memory polymer, which has a $T_g$ and comprises a deformable state at temperatures above the $T_g$ and a rigid state at temperatures below the $T_g$. During or after the forming, a mounting structure is bonded to the reversible adhesive.

The attachment method comprises, according to one embodiment: providing a reusable attaching apparatus including a reversible adhesive bonded to a mounting structure, where the reversible adhesive comprises a shape memory polymer having a $T_g$ and comprising a deformable state at temperatures above the $T_g$ and a rigid state at temperatures below the $T_g$; heating the reversible adhesive to a temperature above the $T_g$, such that the shape memory polymer reaches the deformable state; during the heating, contacting the reversible adhesive with a mounting surface and applying pressure thereto, such that the reversible adhesive deforms and increases in contact area with the mounting surface; and cooling the reversible adhesive to a temperature below the $T_g$, such that the shape memory polymer adopts the rigid state and the reversible adhesive adheres to the mounting surface with an adhesion strength of at least about 1 MPa. Thus, the reusable attaching apparatus is attached to the mounting surface.

The attachment method comprises, according to another embodiment: providing a reusable attaching apparatus including a reversible adhesive bonded to a mounting structure, where the reversible adhesive comprises a shape memory polymer having a $T_g$ and comprising a deformable state at temperatures above the $T_g$ and a rigid state at temperatures below the $T_g$; heating the reversible adhesive to a temperature above the $T_g$, such that the shape memory polymer reaches the deformable state; during the heating, contacting the reversible adhesive with a mounting surface covered entirely or partially by a liquid and applying pressure thereto, such that the reversible adhesive deforms and increases in contact area with the mounting surface while the liquid is forced from the contact area; and cooling the reversible adhesive to a temperature below the $T_g$, such that the shape memory polymer adopts the rigid state and the reversible adhesive adheres to the mounting surface with an adhesion strength of at least about 1 MPa. Thus, the reusable attaching apparatus is attached to the mounting surface.

DETAILED DESCRIPTION

Described in this disclosure is a reusable attaching apparatus based on a shape memory polymer (SMP) adhesive, which may be strongly adhered to a surface while supporting a weight or other load without sacrificing ease of clean (residue-free) removal.

A SMP is a polymer that exhibits the property of shape memory, which allows the SMP to be deformed and fixed into a temporary shape that is maintained until the SMP is stimulated to return to its previous "remembered" permanent shape. Most commonly the SMP is a thermosensitive SMP capable of undergoing either a glass or melting transition at a particular temperature, below which it is rigid and difficult to deform, and above which it is much softer and deforms easily. This transition may be generally be referred to as a glass transition, corresponding to a glass transition temperature ($T_g$), below which the SMP may be said to be in its glassy state, and above which the SMP may be said to be in its rubbery or deformable state. Typically, the glass transition encompasses a range of temperatures, as opposed to a single temperature, and thus the glass transition temperature $T_g$ may be referred to as a glass transition temperature zone $T_g$.

In its rubbery state at an elevated temperature, the SMP adhesive is flexible and may easily conform to an adherend upon application to the surface. The conformability may be macroscopically apparent, such as in the case of a curved or otherwise non-flat surface, while also occurring on the molecular level, where intermolecular forces (e.g., van der Waals forces) generate a strong net adhesion between the SMP and the surface. Peeling is inhibited when the SMP is cooled below its $T_g$, typically with loading, such that it becomes rigid and fixed into its conformal, temporary shape. In its rigid temporary state, conformed to the adherend, the SMP may be strongly and stably bonded and may not be easily removed. Heating the SMP above its $T_g$ returns it to its rubbery state, at which point the SMP may be easily peeled or otherwise removed from the surface. Under stress free conditions, while in its rubbery state, the SMP will additionally return to its original permanent shape. The adhesive SMP surface is not adversely affected during this process since the adhesion is entirely dry adhesion; in other words, a consumable layer of tacky adhesive is not required. At room temperature, which is typically below the $T_g$, the SMP is not tacky and is therefore resistant to surface contamination.

Figure 1A:
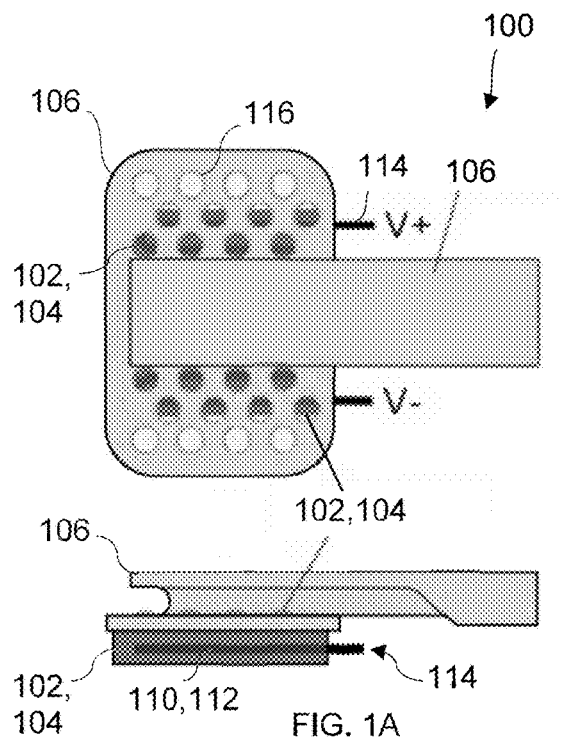
FIGS. 1A and 1B show views of an exemplary reusable attaching apparatus comprising a reversible adhesive bonded to a mounting structure, where the reversible adhesive comprises a shape memory polymer (SMP), and the mounting structure includes a hook.
Figure 1B:
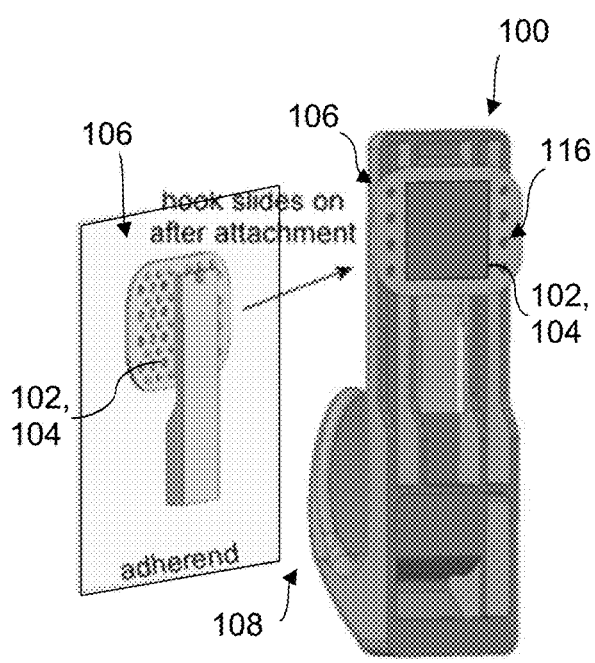

Referring to FIGS. 1A and 1B, the reusable attaching apparatus 100 comprises a reversible adhesive 102 comprising a shape memory polymer 104. As explained above, the SMP has a glass transition temperature ($T_g$) and comprises a deformable state at temperatures above the $T_g$ and a rigid state at temperatures below the $T_g$. The reusable attaching apparatus 100 also comprises a mounting structure 106 bonded to the reversible adhesive 102 that may include (for example) a peg, bracket, or hook 108, as shown in FIG. 1B. The reusable attaching apparatus 100 may be employed for wall hanging, wall climbing, pick-and-place of objects, assembly of modular structures (e.g., furniture), and/or other applications.

Figure 2A:
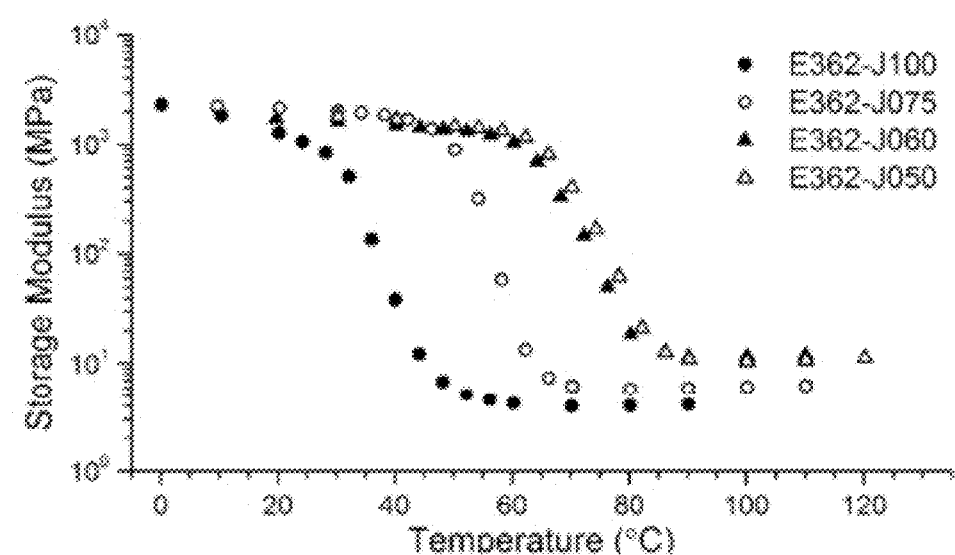
FIGS. 2A-2C are plots of storage modulus versus temperature for SMPs formed from different SMP precursor/crosslinking agent combinations.
Figure 2B:
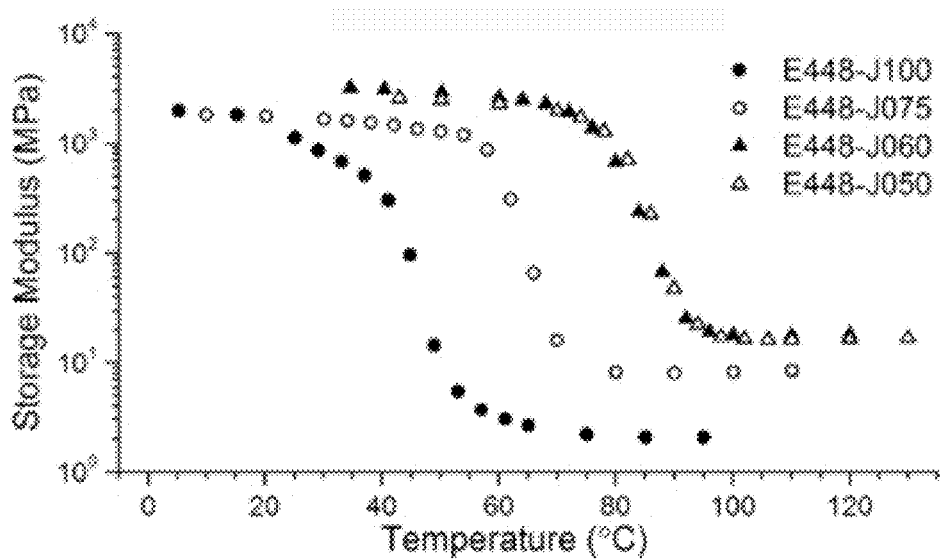
Figure 2C:
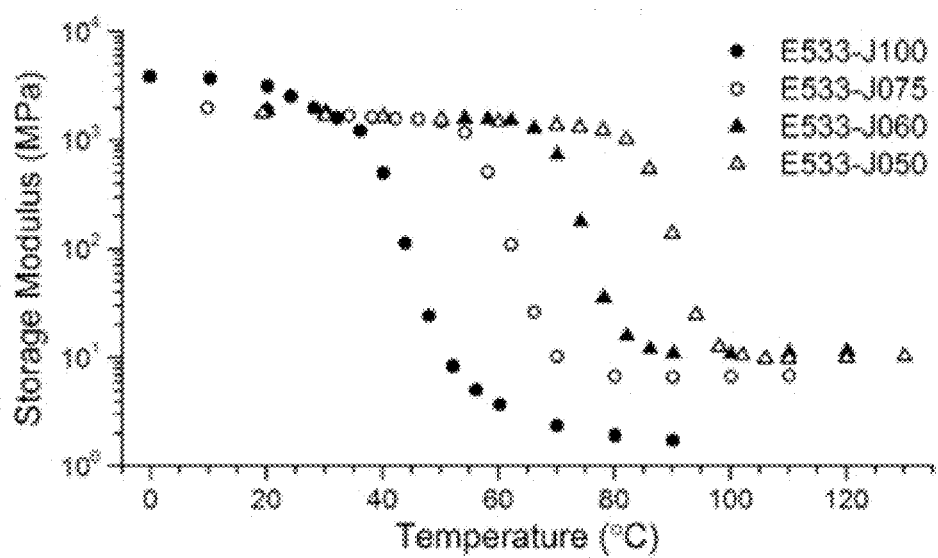

The shape memory polymer may comprise a polyepoxide, polyeurethane, poly(ethylene-co-vinyl acetate), polycyclooctene, and/or another polymer. Generally speaking, the shape memory polymer may be prepared from a formulation that includes a shape memory polymer precursor or resin (e.g., one or more monomers) and a crosslinking agent. The polymer properties and glass transition temperature may be varied by adjusting the mixing proportions of the SMP precursor and the crosslinking agent. The data of FIGS. 2A-2C show how the storage modulus of a SMP varies as a function of temperature for various SMP precursor/crosslinking agent combinations, where Jeffamine D-230 (Huntsman Corp.) is used as the crosslinking agent. Jeffamine D-230 is an epoxy curing agent that may be referred to as a polyetheramine. The glass transition temperature can be identified by a sudden and rapid drop in the storage modulus; thus, the data of FIGS. 2A-2C reveal the range of temperatures associated with the glass transition for SMPs prepared from different formulations.

Table 1 in the Examples below provides a summary of the SMP formulations prepared and evaluated in this disclosure. Formulation names are derived from the molecular weight or average molecular weight of the SMP precursor (e.g., one or more epoxy monomers), followed by the molar proportion of the crosslinking agent in the formulation with respect to one mole of the SMP precursor. For example, the formulation labeled E533-J050 includes a mixture of epoxy monomers with an average molecular weight of 533 g/mol, and the molar proportion of Jeffamine D-230 is 0.5, corresponding to a 1 to 0.5 (1:0.5) molar ratio of the SMP precursor to the crosslinking agent. The formulation labeled E448-J100 includes a mixture of epoxy monomers with an average molecular weight of 448 g/mol, and the molar proportion of the Jeffamine D-230 is 1.0, corresponding to a 1:1 molar ratio of the SMP precursor to the crosslinking agent.

FIG. 2A includes storage modulus data for SMPs prepared from formulations comprising Epon 362/Jeffamine D-230, where the SMP precursor has a molecular weight of 362 g/mol; FIG. 2B includes storage modulus data for SMPs prepared from formulations comprising (Epon 362 and Epon 1075)/Jeffamine D-230, where the SMP precursor has an average molecular weight of 448 g/mol; and FIG. 2C includes storage modulus data for SMPs prepared from formulations comprising (Epon 362 and Epon 1075)/Jeffamine D-230, where the SMP precursor has an average molecular weight of 533 g/mol. The different data curves in each plot correspond to formulations having different molar proportions of the SMP precursor and the crosslinking agent. For the SMP data of each of FIGS. 2A-2C, the molar ratio of the SMP precursor to the crosslinking agent are 1:1, 1:0.75, 1:0.60, and 1:0.50.

It can be observed from the storage modulus data that increasing the proportion of the crosslinking agent in the formulation can reduce the glass transition temperature $T_g$ of the SMP and may also soften the SMP, particularly in its rubbery state. Generally speaking, the molar ratio of the SMP precursor to the crosslinking agent may be from about 0.5:1 to about 1.5:1 (about 1:2 to about 1:0.67), and is preferably in the range from about 0.5:1 to about 1:1 (about 1:2 to about 1:1). A softer rubbery state is desirable to reduce the amount of preload necessary to obtain a large contact area of the reversible adhesive during bonding, particularly against relatively rough surfaces, while a rigid glassy state is desirable to inhibit interfacial crack growth during usage. Among the formulations with the highest crosslinking agent concentration (a 1:1 molar ratio), the storage modulus in the rubbery state decreases from 4 MPa to 2 MPa and 1.7 MPa with increasing average molecular weight of the SMP precursor, as shown in FIGS. 2A, 2B, and 2C, respectively.

Preferably, the storage modulus of the SMP in the rubbery state (above the $T_g$) is no greater than about 4 MPa, or no greater than about 2 MPa.

In view of the impact of increasing molecular weight on storage modulus, may be beneficial to prepare the shape memory polymer of the reversible adhesive from a SMP precursor that includes one or more monomers having a molecular weight (or an average molecular weight) of at least about 400 g/mol, or at least about 500 g/mol. For example, the shape memory polymer precursor may comprise a mixture of at least two epoxy monomers each having a different molecular weight, where an average molecular weight of the mixture is at least about 400 g/mol, or at least about 500 g/mol. As would be recognized by the skilled artisan, the average molecular weight of a mixture including two monomers (e.g., monomer 1 and monomer 2) may be calculated by the following formula: (molecular weight of monomer 1)(molar proportion of monomer 1)+(molecular weight of monomer 2)(molar proportion of monomer 2)=average molecular weight. The different molecular weights of the epoxy monomers in the mixture may be, in one example, 362 g/mol and 1075 g/mol, as shown by the data of FIGS. 2B and 2C. The preceding formula for average molecular weight may be expanded to include more than two monomers, as would be recognized by one of ordinary skill in the art.

Typically, the $T_g$ of the shape memory polymer is above room temperature such that the SMP is in the glassy state at room temperature. As shown by the data of FIGS. 2A-2C, the $T_g$ may lie in a range from about 30° C. to about 70° C., from about 40° C. to about 60° C., or from about 30° C. to about 50° C. Preferably, the $T_g$ is above "ambient" temperature, which may be a small range when indoors (e.g., typically 20-25° C.) but may be a wider range when outdoors (e.g., from below 0° C. to about 35° C.). Thus, it is preferred that the $T_g$ of the shape memory polymer is at least about 30° C. or at least about 35° C., and it may be beneficial for the $T_g$ to be at least about 40° C. in order to ensure that the $T_g$ is above ambient temperature. Typically, the $T_g$ is no higher than about 70° C.

Heat may be supplied to activate shape recovery and/or to reach the rubbery state of the SMP via internal and/or external heating of the reversible adhesive. Internal heating may be accomplished with an embedded resistive heating element (e.g., a composite conductive SMP which is capable of dissipating electrical current internally) or by irradiating the SMP or a composite SMP with infrared or otherwise wavelengths of radiation which the adhesive material may absorb. External heating sources can include any source of heat directly adjacent to the SMP adhesive either as part of the reusable attaching apparatus or as part of the adherend, such as a resistive heater. The external heating source may alternatively utilize convective or radiant heating and may take the form of a hair dryer, heat gun, laser or other light source.

Figure 3:
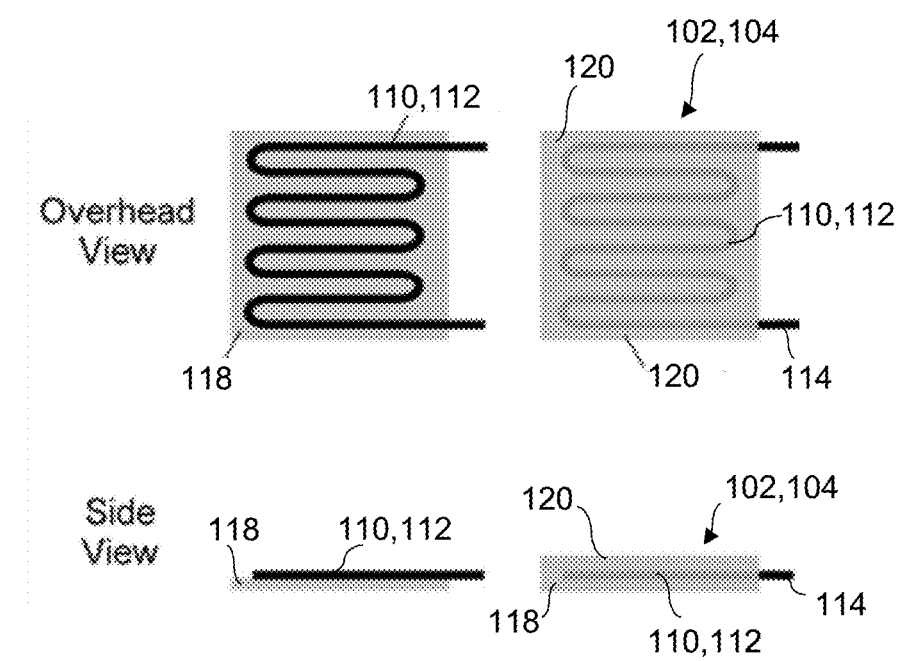
FIG. 3 shows top and side view schematics of a reversible adhesive fabricated to include an embedded resistive heating element (e.g., conductive wire).
Figures 4A, 4B, 4C, 4D:
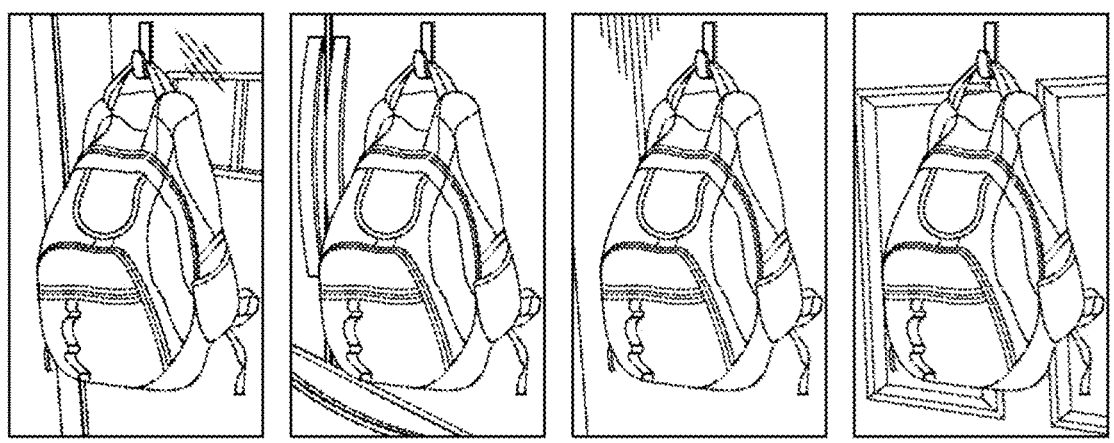
FIGS. 4A-4D show images of an exemplary reusable attaching apparatus supporting the weight of a backpack loaded with approximately 3 kg of items while bonded to various surfaces, including a glass door (FIG. 4A), a curved plastic refrigerator door (FIG. 4B), a wooden door (FIG. 4C), and a powder-coated metal door (FIG. 4D).

Thus, in one example, as shown in FIG. 1A and FIG. 3, the reusable attaching apparatus may further include an internal heating element 110 embedded in the reversible adhesive 102. The internal heating element 110 may be a resistive heating element 112 such as an electrically conductive coil (e.g., a NiCr wire) or electrically conductive particles dispersed in the SMP 104 at a percolation threshold. The resistive heating element 112 may further include exposed electrical contacts 114 for electrical connection to an external power source. Also or alternatively, the internal heating element 110 may include light-absorbing particles.

A prototype reusable attaching apparatus including an internal heating element was created to demonstrate its use for in-home wall hanging applications. The apparatus was fabricated by embedding a coil of nichrome (NiCr) wire within a reversible adhesive comprising a shape memory polymer. The SMP of this example was prepared from a 1:1 molar ratio of Jeffamine D-230 and a SMP precursor with an average molecular weight of 448 g/mol. The reversible adhesive with the embedded nichrome wire was then glued to a 3D-printed attachment piece, which provides an attachment point for a hook. Heat may be supplied to the apparatus during bonding and de-bonding by passing an electrical current through the resistive nichrome wire. To effect bonding, the SMP may be briefly heated while manually pressing the attaching apparatus against the adherend, and then cooling to the rigid (glassy) state. A 7.4V lithium-ion polymer battery can be employed as the power source. The prototype reusable attaching apparatus is shown in FIGS. 4A-4D supporting the weight of a backpack loaded with approximately 3 kg of items while bonded to various surfaces, including a glass door, a curved plastic refrigerator door, a wooden door, and a powder-coated metal door, respectively. The reversible adhesive may exhibit an adhesion strength of at least about 1 MPa and/or a storage modulus of at least about 100 MPa at room temperature. Preferably, the adhesion strength is at least about 1.5 MPa.

A general method for fabricating a reusable attaching apparatus may include forming a reversible adhesive comprising a shape memory polymer having a glass transition temperature ($T_g$), where the SMP comprises a deformable state at temperatures above the $T_g$ and a rigid state at temperatures below the $T_g$; and, during or after the forming, bonding a mounting structure to the reversible adhesive. As described above, the mounting structure may include a hook, bracket or peg, and the shape memory polymer may comprise a polymer selected from the group consisting of: polyepoxide, polyurethane, poly(ethylene-co-vinyl acetate) and polycyclooctene.

In an example where the bonding of the mounting structure occurs after forming the reversible adhesive, the bonding may comprise placing a bonding agent between the reversible adhesive and the mounting structure, and curing or drying the bonding agent, which may take the form of a temperature-resistant glue or an uncured shape memory polymer. Alternatively, the bonding may entail mechanical attachment or fastening of the reversible adhesive to the mounting structure.

In an example where the bonding of the mounting structure occurs during the formation of the reversible adhesive, the bonding may comprise contacting the mounting structure with the formulation during curing, such that the mounting structure is bonded to the reversible adhesive as the curing is completed. The mounting structure 106 may include holes, indentations or protrusions 116, as shown in the schematics of FIGS. 1A and 1B, into which or about which the SMP precursor may flow, thereby promoting attachment of the mounting structure 106 to the reversible adhesive 102 upon curing.

Forming the reversible adhesive may entail providing or preparing a formulation of a shape memory polymer precursor and a crosslinking agent, and curing the formulation to form the shape memory polymer. The SMP precursor may comprise one or more monomers having a molecular weight (or an average molecular weight) of at least about 400 g/mol, or at least about 500 g/mol. Preferably, the SMP precursor includes a mixture of at least two epoxy monomers each having a different molecular weight, where an average molecular weight of the mixture is at least about 400 g/mol. The average molecular weight of the mixture may also be at least about 500 g/mol. The different molecular weights of the epoxy monomers may be, for example, 362 g/mol and 1075 g/mol. A molar ratio of the SMP precursor to the crosslinking agent is in a range from about 0.5:1 to about 1.5:1, and preferably lies in a range from about 0.5:1 to about 1:1. As explained above, increasing the proportion of the crosslinking agent and/or increasing the molecular weight of the SMP precursor may be associated with a reduction in the glass transition temperature $T_g$ and/or with softening of the shape memory polymer, particularly in its rubbery (deformable) state. The crosslinking agent may comprise a polyetheramine such as Jeffamine D-230. Polyetheramines may include primary amino groups attached to the end of a polyether backbone normally based on propylene oxide, ethylene oxide or a mixture of both compounds.

An internal heating element may be added to the formulation prior to curing, thereby embedding the internal heating element in the reversible adhesive once curing takes place. Alternatively, prior to adding the internal heating element, the formulation may be cured to form a surface layer 118, as shown on the left-hand side of FIG. 3, and the internal heating element 110 may then be placed on the surface layer 118. In a next step, the surface layer 118 and internal heating element 110 may be covered with an additional formulation (preferably identical to the formulation used to form the surface layer), which may then be cured to form an encapsulating layer 120 over the internal heating element 110, as shown on the right-hand side of FIG. 3. In this example, the reversible adhesive 102 includes the surface layer 118 and the encapsulating layer 120, both of which comprise the shape memory polymer 104. The internal heating element 110 may have any of the characteristics described above. For example, the internal heating element 110 may comprise an electrically conductive wire 112, as shown, electrically conductive particles, and/or light-absorbing particles.

A method of attaching a reusable attaching apparatus to a surface entails, as a first step, providing or forming a reusable attaching apparatus that includes a mounting structure bonded to a reversible adhesive comprising a shape memory polymer. The shape memory polymer has a glass transition temperature ($T_g$) and exhibits a deformable state at temperatures above the $T_g$ and a rigid state at temperatures below the $T_g$, as discussed above. To effect attachment, the reversible adhesive is heated to a temperature above the $T_g$, such that the shape memory polymer reaches the deformable state. During the heating, the reversible adhesive is contacted with a mounting surface and pressure is applied to the reversible adhesive. Accordingly, the reversible adhesive deforms and increases in contact area with the mounting surface. The reversible adhesive is cooled to a temperature below the $T_g$, such that the shape memory polymer adopts the rigid state and the reversible adhesive adheres to the mounting surface with an adhesion strength of at least about 1 MPa, and preferably at least about 1.5 MPa. Thus, the reusable attaching apparatus is attached to the mounting surface.

The reversible adhesive may have any of the characteristics and/or properties described above or elsewhere in this disclosure. The mounting surface to which the reusable attaching apparatus is attached may be planar, curved, smooth, rough, dry, and/or wet. The mounting surface may further comprise any synthetic or natural material, ranging from one or more metals, ceramics, polymers, and/or semiconductors to paper, fabric, and/or wood.

As indicated above, the mounting surface may be a wet surface. For example, the method may be carried out outdoors during inclement weather or utilizing a mounting surface immersed in water (e.g., part of a boat or in a swimming pool). In such a case, the method entails contacting the reversible adhesive with a wet mounting surface, that is, a mounting surface covered entirely or partially by a liquid (e.g., water), and applying pressure to the reversible adhesive, such that the reversible adhesive deforms and increases in contact area with the mounting surface while the liquid is forced from the contact area. Ultimately, most or all molecules of the liquid (e.g., water molecules) are removed from the contact area as the reversible adhesive conformally contacts the mounting surface. The mounting process (on either a wet or dry surface) is facilitated by utilizing a "soft" SMP that has a low storage modulus in the rubbery state such that conformal contact may be achieved at a minimal applied load (e.g., at a pressure as low as 0.05 atm). The reversible adhesive is then cooled to a temperature below the $T_g$, such that the shape memory polymer adopts the rigid state and the reversible adhesive adheres to the mounting surface with an adhesion strength of at least about 1 MPa, or preferably at least about 1.5 MPa, as set forth above. Thus, the reusable attaching apparatus may be successfully attached to a wet or dry mounting surface. While it is assumed that in most practical applications the wet mounting surface is covered entirely or partially by water or an aqueous solution, the method as described above may also be applied if the wet mounting surface is covered in full or in part by another type of liquid.

After the cooling, the reversible adhesive may be reheated to a temperature above the $T_g$ to detach the reusable attaching apparatus from the mounting surface. The heating and the optional reheating may comprise internal or external heating of the SMP. For example, the heating and/or reheating may comprise resistive heating carried out with a resistive heating element embedded in or positioned adjacent to the reversible adhesive. The heating may also or alternatively entail conductive, radiative, or convective heating using an external heat source, such as a laser or other light source, a heat gun, a hair dryer, and/or a resistive heater.

In one example, when the heating and/or reheating includes resistive heating, a resistive heating element 112 may be electrically connected to an external power source and an electrical current flowed through the resistive heating element, as indicated schematically by the V+ and V− nomenclature in FIG. 1A. As described above, the resistive heating element 112 may comprise an electrically conductive coil and/or electrically conductive particles at a percolation threshold in the SMP. In another example, the internal heating element may comprise light-absorbing particles that are activated by an external heat source, such as a laser.

The heating, the optional reheating, and/or the cooling may be carried out for a time duration of about 1 minute or less. The cooling of the reversible adhesive may comprise passive cooling carried out by cessation of the heating. Also or alternatively, the cooling may comprise active cooling utilizing a heat sink element, a gas jet, or another cooling aid.

Figure 7:
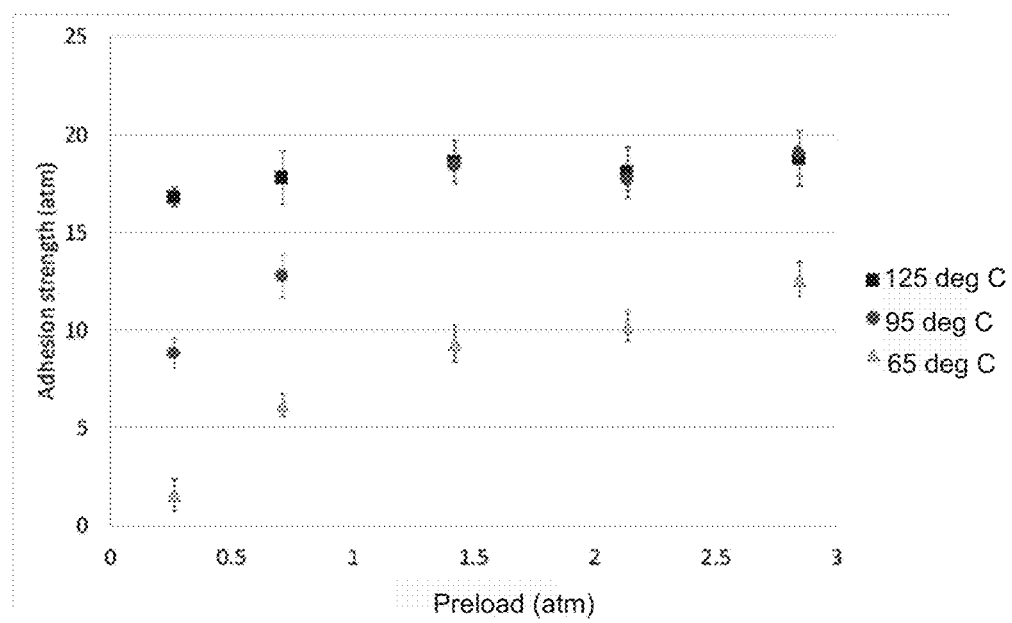
FIG. 7 shows adhesion strength of an exemplary reversible adhesive while immersed in water as a function of preload for different heating temperatures.

As noted above, the mounting process is facilitated by utilizing a "soft" SMP that has a low storage modulus in the rubbery state such that conformal contact may be achieved at a minimal applied load (e.g., at a pressure as low as 0.05 atm). The mounting process may also be improved by heating the reversible adhesive to a higher temperature, since the softness of the SMP may increase with temperature (as evidenced by the data of FIGS. 2A to 2C); a softer reversible adhesive may be more readily able to make conformal contact with the surface during mounting. Accordingly, a higher adhesion strength may be obtained when higher temperatures are employed to heat the reversible adhesive during the mounting process, even at a low applied pressure, as shown by the data of FIG. 7, which are described in more detail in the Examples below. Advantageously, the reversible adhesive is heated to a temperature at least about 120% of the $T_g$, at least about 140% of the $T_g$, or at least about 160% of the $T_g$. The heating is of course carried out below a temperature at which the SMP may degrade. Generally speaking, the pressure applied to the reversible adhesive may be in a range from about 0.05 atm to about 10 atm.

Examples

1. Reversible Adhesives Based on Different SMP Formulations

A number of exemplary reversible adhesives are fabricated from different SMP formulations and their shape memory and other properties are evaluated.

Synthesis: The SMP formulations include one epoxy monomer or a mixture of two epoxy monomers as the SMP precursor and Jeffamine D-230 (poly(propylene glycol)bis (2-aminopropyl) ether; Huntsman Corp.) as the crosslinking or curing agent. The epoxy monomers employed for this investigation include EPON 826 obtained from Momentive (molecular weight, $M_n$~362 g/mol) and poly(bisphenol A-co-epichlorohydrin), glycidyl end-capped obtained from Sigma-Aldrich (molecular weight, $M_n$~1075 g/mol), hereafter referred to as "E1075." Intermediate epoxy monomer weights, determined on a molar basis, are created by mixing EPON 826 and E1075 in the ratios provided in Table 1. The proportion of Jeffamine D-230 used for each SMP formulation is likewise included in Table 1, on both molar and weight bases.

molecular weight of 533 g/mol, and the molar proportion of Jeffamine D-230 is 0.5, corresponding to a 1 to 0.5 (1:0.5) molar ratio of the SMP precursor to the crosslinking agent. The formulation labeled E448-J100 includes a mixture of epoxy monomers with an average molecular weight of 448 g/mol, and the molar proportion of the Jeffamine D-230 is 1.0, corresponding to a 1:1 molar ratio of the SMP precursor to the crosslinking agent.

To prepare the SMP formulations, the epoxy monomer(s) are combined in a glass container, heated to 120° C. to ensure complete melting, and then thoroughly mixed by manual stirring while still at 120° C. Room temperature Jeffamine D-230 is then stirred into the epoxy mixture. Test samples for dynamic mechanical analysis (DMA) and adhesive blister testing are created by pouring the resulting mixture onto glass plates and curing for several minutes at 100° C. until the SMP precursor becomes viscous enough to spread into a uniform and thin sheet. Curing is completed in an oven at 100° C. for 90 min. Samples are cut from the resulting sheets using a laser cutter and then removed from the glass at elevated temperature.

The formula for NGDE2 has been previously described (e.g., Xie and Rousseau, *Polymer* 50 (2009) 1852-1856); in this work the curing procedure and sample preparation are the same as described above.

Dynamic Mechanical Analysis (DMA) Testing:

A Q800 DMA from TA Instruments (New Castle, Del.) is used to perform all SMP mechanical analysis, failure strain measurements, and SMP fixity and recovery factor measurements. Laser-cut samples of rectangular cross section approximately 1.75 mm wide and 0.5 mm thick are used. Storage modulus data are reported at 1 Hz excitation, with data collection at discrete temperature intervals where the chamber is allowed to equilibrate for four minutes. Failure strain data are collected in uniaxial tension by ramping tensile force on each sample at a rate of 1 N/min until failure. Engineering stress and strain are reported based on the test sample's initial length and cross sectional area. Shape fixity and recovery factors are determined according to reference

TABLE 1

SMP Formulation Details for Exemplary Reversible Adhesives

| Formulation | SMP Precursor $M_n$ (g/mol) | Molar proportion | | | Weight proportion | | |
|---|---|---|---|---|---|---|---|
| | | EPON 826 | E1075 | Jeffamine | EPON 826 | E1075 | Jeffamine |
| E362-J100 | 361.9 | 1.000 | — | 1.000 | 1.000 | | 0.636 |
| E362-J075 | | | | 0.752 | 1.000 | | 0.478 |
| E362-J060 | | | | 0.599 | 1.000 | | 0.381 |
| E362-J050 | | | | 0.500 | 1.000 | | 0.318 |
| E448-J100 | 447.6 | 0.899 | 0.101 | 1.000 | 1.000 | 0.334 | 0.707 |
| E448-J075 | | | | 0.752 | 1.000 | 0.334 | 0.531 |
| E448-J060 | | | | 0.599 | 1.000 | 0.334 | 0.423 |
| E448-J050 | | | | 0.500 | 1.000 | 0334 | 0.353 |
| E533-J100 | 533.3 | 0.760 | 0.240 | 1.000 | 1.000 | 0.940 | 0.837 |
| E533-J075 | | | | 0.752 | 1.000 | 0.940 | 0.629 |
| E533-J060 | | | | 0.599 | 1.000 | 0.940 | 0.501 |
| E533-J050 | | | | 0.500 | 1.000 | 0.940 | 0.418 |

As mentioned above, formulation names are derived from the molecular weight or average molecular weight of the SMP precursor (e.g., one or more epoxy monomers), followed by the molar proportion of the crosslinking agent in the formulation with respect to one mole of the SMP precursor. For example, the formulation labeled E533-J050 includes a mixture of epoxy monomers with an average definitions (e.g., Xie, *Polymer* 52 (2011) 4985-5000) for a single shape fixing and recovery cycle.

Storage modulus data are shown in FIGS. 2A-2C for SMPs prepared from formulations with a molecular weight (or an average molecular weight) of the SMP precursor of 362 g/mol, 448 g/mol, and 533 g/mol, where the different data sets in each plot correspond to different ratios of the SMP precursor to the crosslinking agent, as set forth in Table 1. Comparing the E448-J050 and E448-J100 formulations, for example, shows a decrease in rubber state storage modulus ($E_r$) of the SMP by a factor of eight from 16 MPa to 2 MPa by doubling the crosslinking agent concentration. These observations indicate that an anticipated reduction in crosslinking density is achieved. The flat rubbery and glassy plateaus, together with the narrow $T_g$ band, suggest the presence of strong shape memory performance in each of the twelve formulations. Changing the proportion of the crosslinking agent may have a strong effect on the $T_g$ of the SMP, particularly at higher concentrations. This is clearly evident in the E362 and E448 series tests where, for example E362-J050 and E362-J060 are nearly the same, while E362-J060, E362-J075, and E362-J100 are substantially different, though significant and nearly uniform changes to $T_g$ are observed between each variant of the E533 series of SMP. Varying the average molecular weight of the SMP precursor has little effect on the shape and character of the modulus curves, except a noticeable reduction in rubbery state modulus for the higher-weight formulations. Among those formulations with the highest crosslinking agent concentration, E362-J100, E448-J100, and E533-J100, the storage modulus decreases with increasing SMP precursor molecular weight from 4 MPa to 2 MPa and 1.7 MPa, respectively.

Figure 5A:
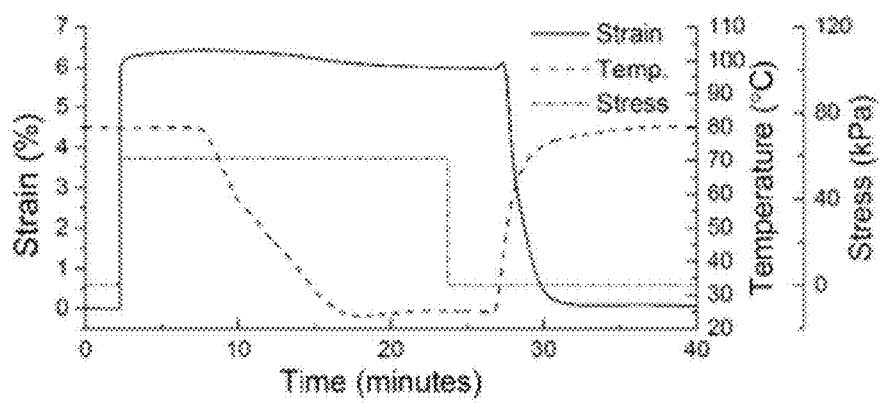
FIG. 5A shows a shape memory cycle of a SMP prepared from E533-J100, where stress, strain and temperature are plotted as a function of time.
Figure 5B:
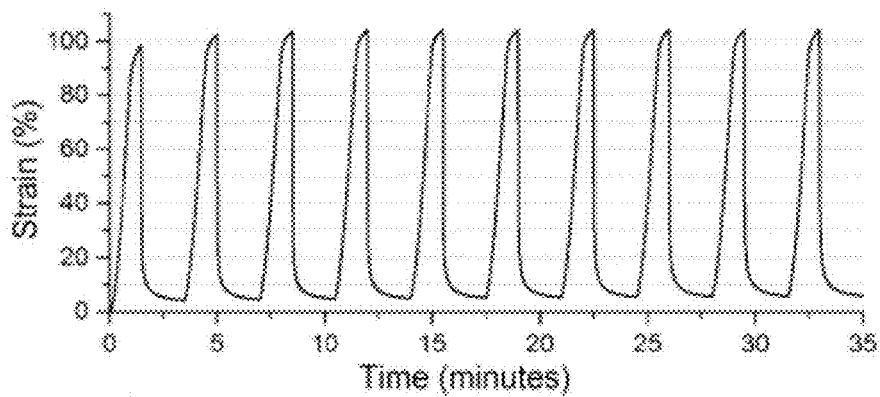
FIG. 5B shows cyclic strain and recovery of a SMP at 50° C. prepared from E448-J100.
Figure 5C:
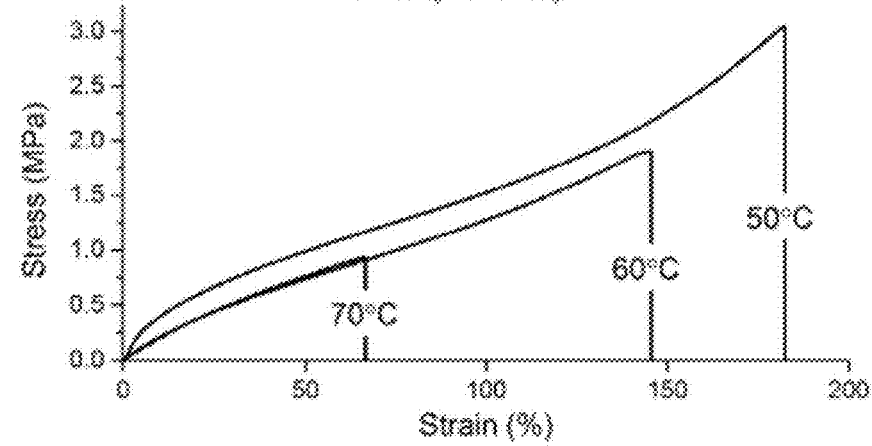
FIG. 5C shows typical uniaxial stress-strain curves at 50° C., 60° C. and 70° C. for a SMP prepared from E448-J100.
Figure 5D:
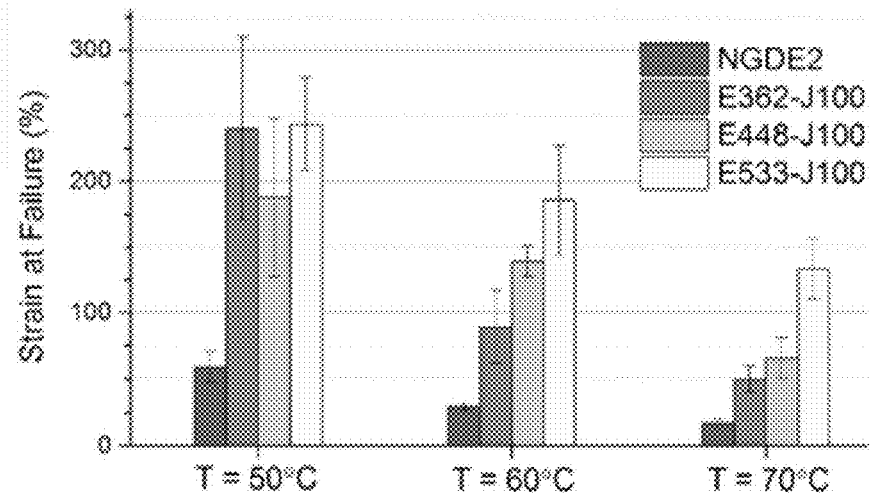
FIG. 5D shows failure strain results for SMPs prepared from four different SMP formulations, NGDE2, E362-J100, E448-J100, and E533-J100, where the error bars represent 95% Student's t-test confidence intervals.

FIG. 5A shows a shape memory cycle of a SMP prepared from E533-J100, where stress, strain and temperature are plotted as a function of time. FIG. 5B shows cyclic strain and recovery at 50° C. of a SMP prepared from E448-J100, and FIG. 5C shows typical uniaxial stress-strain curves at 50° C., 60° C. and 70° C. for a SMP prepared from E448-J100. FIG. 5D shows failure strain results for SMPs prepared from four different SMP formulations, NGDE2, E362-J100, E448-J100, and E533-J100, where the error bars represent 95% Student's t-test confidence intervals.

Blister Adhesion Testing

Thin (~0.50 mm) circular samples of several SMPs prepared from different formulations are bonded to form a seal over a 1 cm diameter circular glass opening of a pressure chamber by first heating the glass surface to 75° C., followed by applying light pressure to ensure SMP-glass contact, and maintaining 75° C. for three minutes. Temperature is controlled by an AGPtek® universal digital PID temperature controller. Tests are performed after allowing the sample to cool to the desired temperature. The flexibility of the thin SMP membranes allow them to self-conform to the glass adherend when heated, obviating the need for preload during the bonding process. Pressure is applied through a manual regulating system, increasing pressure by ~70 kPa/min until interfacial failure is observed to have initiated.

Figure 6:
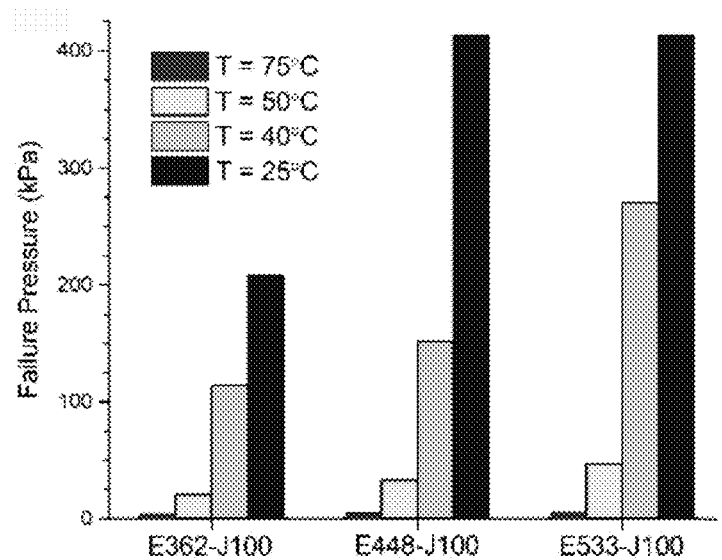
FIG. 6 shows pressure results of blister adhesion tests for SMPs prepared from three different SMP formulations (E362-J100, E448-J100, and E533-J100), where the tests are conducted with each SMP in its glassy state (25° C.), rubbery state (75° C.), and at two intermediate temperatures.

Pressure results of the blister adhesion tests are summarized in FIG. 6 for SMPs prepared from three different SMP formulations, E362-J100, E448-J100, and E533-J100. Tests are conducted with each SMP in its glassy state (25° C.), rubbery state (75° C.), and at two intermediate temperatures. The results clearly show an increase in failure pressure, indicating enhanced adhesive strength, as the SMP's temperature is reduced through its glass transition. This trend may be due to the increase in storage modulus and corresponding inhibition of crack propagation. The failure pressure is also influenced by the formulation, with a higher molecular weight SMP precursor yielding enhanced adhesion. This result may be due to enhanced energy dissipation, particularly at lower temperatures, for the higher molecular weight formulations. This theory is supported by observing that the measured loss modulus increases significantly with increased monomer weight (231 MPa, 299 MPa, and 534 MPa for E362-J100, E448-J100, and E533-J100 respectively at their peaks ~25 C). The maximum pressure the test apparatus can measure is 410 kPa, which is achieved for 25° C. tests of both the E448-J100 and E533-J100 formulations.

2. Application of Reversible Adhesives to Wet Surfaces

During heating of a reversible adhesive and contacting with a wet mounting surface as described above, the reversible adhesive can effectively squeeze out a continuous or discontinuous liquid layer from the contact area due to its softness and conformality. This allows the reversible adhesive to adhere strongly to the mounting surface upon cooling of the SMP. In order to demonstrate liquid removal as the reversible adhesive contacts a wet surface, experiments are carried out with a red dye.

A diluted red dye (Cole-Parmer Fluorescent Fwt Red Dye Concentrate) and a SMP drum of 6.35 mm in diameter and 2 mm in thickness are prepared. The SMP precursor used in this experiment is a mixture of two epoxy monomers (EPON 826, E1075) and curing agent (Jeffamine D-230) in a 0.76:0.24:1 molar ratio respectively (E533-J100 of Table 1). The SMP drum is pre-heated on a 125° C. hot plate for 10 sec. Several drops of the diluted red dye are placed on the glass slide using a pipet and the heated SMP drum is positioned on the droplets. Initially, the diluted red dye presents between the SMP drum and the glass slide. After 3 atm of axial pressure is applied to the SMP drum, most of the diluted red dye is squeezed out from the adhesion interface (contact area). A hermetic condition of the adhesion interface is preserved after 20 minutes of cooling in ambient air. Upon cooling, the temporary deformed shape is "locked" and the SMP becomes rigid enough to adhere strongly to the glass slide. Even after removal of the applied pre-load, the hermetic condition is maintained.

The adhesion strength of the reversible adhesive while immersed in water is measured as a function of preload for different heating temperatures. The SMP drum (prepared from formulation E533-J100 of Table 1) is contacted with a glass slide submerged in deionized (DI) water. The SMP drum on the glass slide is heated by an external heater to three different temperatures, 65° C., 95° C., and 125° C., before preloading. The temperatures are measured by a thermocouple positioned adjacent to the external heater. While maintaining the applied preload, the SMP drum is cooled down to 35° C. to ensure a complete glass transition. Subsequently, the adhesion strength is measured by applying an increasing normal stress onto the adhesive interface until the reversible adhesive is removed, and the data are presented in FIG. 7. The data squares in FIG. 7 show the adhesion strength of the reversible adhesive when during external heating to 125° C. In this case, the SMP becomes soft enough to make conformal contact with the glass slide and successfully force water from the contact area (adhesive interface), regardless of the amount of preload. The saturated adhesion strength is measured as 18 atm, which is comparable to that measured under dry conditions. On the other hand, when the reversible adhesive is heated up to 95° C. (data circles in FIG. 7), at least 1.5 atm of preload is required to achieve the saturated adhesive strength. When the SMP is heated up to a temperature within the glass transition temperature zone (data triangles), the adhesion strength fails to reach its maximum value.

Although the present invention has been described in considerable detail with reference to certain embodiments thereof, other embodiments are possible without departing from the present invention. The spirit and scope of the appended claims should not be limited, therefore, to the description of the preferred embodiments contained herein.

All embodiments that come within the meaning of the claims, either literally or by equivalence, are intended to be embraced therein.

Furthermore, the advantages described above are not necessarily the only advantages of the invention, and it is not necessarily expected that all of the described advantages will be achieved with every embodiment of the invention.

The invention claimed is:

1. A method of attaching a reusable attaching apparatus to a surface, the method comprising:
    providing a reusable attaching apparatus comprising: a mounting structure bonded to a reversible adhesive, the reversible adhesive comprising a shape memory polymer having a glass transition temperature ($T_g$) and comprising a deformable state at temperatures above the $T_g$ and a rigid state at temperatures below the $T_g$;
    heating the reversible adhesive to a temperature above the $T_g$, the shape memory polymer reaching the deformable state;
    during the heating, contacting the reversible adhesive with a mounting surface and applying pressure thereto, the reversible adhesive deforming and increasing in contact area with the mounting surface; and
    cooling the reversible adhesive to a temperature below the $T_g$, the shape memory polymer adopting the rigid state and the reversible adhesive adhering to the mounting surface with an adhesion strength of at least about 1 MPa, thereby attaching the reusable attaching apparatus to the mounting surface,
    wherein the shape memory polymer is prepared from a formulation comprising a shape memory polymer precursor and a crosslinking agent, the shape memory polymer precursor comprising a mixture of at least two epoxy monomers each having a different molecular weight, wherein an average molecular weight of the mixture is at least 400 q/mol.

2. The method of claim 1, wherein the adhesion strength is at least about 1.5 MPa.

3. The method of claim 1, wherein the pressure applied to the reversible adhesive is in a range from about 0.05 atm to about 10 atm.

4. The method of claim 1, wherein heating the reversible adhesive comprises heating to a temperature of at least about 120% of the $T_g$.

5. The method of claim 4, wherein the temperature is at least about 160% of the $T_g$.

6. The method of claim 1, wherein the heating comprises conductive, radiative, or convective heating using an external heat source.

7. The method of claim 1, wherein the heating comprises internal heating of the shape memory polymer.

8. The method of claim 7, wherein the internal heating is carried out with a resistive heating element embedded in or positioned adjacent to the reversible adhesive.

9. The method of claim 8, wherein the resistive heating element comprises an electrically conductive coil and/or electrically conductive particles.

10. The method of claim 7, wherein the internal heating is carried out with light-absorbing particles.

11. The method of claim 1, wherein the cooling comprises passive cooling.

12. The method of claim 1, wherein the cooling comprises active cooling.

13. The method of claim 1, further comprising, after the cooling, reheating the reversible adhesive to a temperature above the $T_g$ to detach the reusable attaching apparatus from the mounting surface.

14. The method of claim 1, wherein the mounting surface comprises a natural or synthetic material.

15. The method of claim 1, wherein the mounting surface is planar, curved, smooth, rough, dry and/or wet.

16. The method of claim 1, wherein the mounting surface is covered partially or entirely by a liquid, the mounting surface being a wet surface, and
    wherein, during the heating, as the reversible adhesive deforms and increases in contact area with the mounting surface, the liquid is forced from the contact area.

17. The method of claim 1, wherein the shape memory polymer comprises a storage modulus of about 4 MPa or less in the deformable state.

18. The method of claim 1, wherein the mounting structure includes one or more of the following: hook, bracket, and peg.

19. A method of attaching a reusable attaching apparatus to a surface, the method comprising:
    providing a reusable attaching apparatus comprising: a mounting structure bonded to a reversible adhesive, the reversible adhesive comprising a shape memory polymer having a glass transition temperature ($T_g$) and comprising a deformable state at temperatures above the $T_g$ and a rigid state at temperatures below the $T_g$;
    heating the reversible adhesive to a temperature above the $T_g$, the shape memory polymer reaching the deformable state;
    during the heating, contacting the reversible adhesive with a mounting surface and applying pressure thereto, the reversible adhesive deforming and increasing in contact area with the mounting surface; and
    cooling the reversible adhesive to a temperature below the $T_g$, the shape memory polymer adopting the rigid state and the reversible adhesive adhering to the mounting surface with an adhesion strength of at least about 1 MPa, thereby attaching the reusable attaching apparatus to the mounting surface,
    wherein the mounting surface is covered partially or entirely by a liquid, the mounting surface being a wet surface, and
    wherein, during the heating, as the reversible adhesive deforms and increases in contact area with the mounting surface, the liquid is forced from the contact area.

20. A method of attaching a reusable attaching apparatus to a surface, the method comprising:
    providing a reusable attaching apparatus comprising: a mounting structure bonded to a reversible adhesive, the reversible adhesive comprising a shape memory polymer having a glass transition temperature ($T_g$) and comprising a deformable state at temperatures above the $T_g$ and a rigid state at temperatures below the $T_g$;
    heating the reversible adhesive to a temperature above the $T_g$, the shape memory polymer reaching the deformable state;
    during the heating, contacting the reversible adhesive with a mounting surface and applying pressure thereto, the reversible adhesive deforming and increasing in contact area with the mounting surface; and
    cooling the reversible adhesive to a temperature below the $T_g$, the shape memory polymer adopting the rigid state and the reversible adhesive adhering to the mounting surface with an adhesion strength of at least about 1 MPa, thereby attaching the reusable attaching apparatus to the mounting surface,
    wherein the shape memory polymer is prepared from a formulation comprising a shape memory polymer precursor comprising a mixture of at least two epoxy monomers each having a different molecular weight, and a crosslinking agent, and wherein a first of the epoxy monomers has a molecular weight of 362 g/mole and a second of the epoxy monomers has a molecular weight of 1075 g/mol.

* * * * *